No. 854,609. PATENTED MAY 21, 1907.
F. A. SELLEY.
SCALE.
APPLICATION FILED MAY 29, 1906.

2 SHEETS—SHEET 1.

Witnesses
Louis R. Heinrichs
D. W. Gould

Inventor
F. A. Selley
By Victor J. Evans
Attorney

No. 854,609. PATENTED MAY 21, 1907.
F. A. SELLEY.
SCALE.
APPLICATION FILED MAY 29, 1906.

2 SHEETS—SHEET 2.

Inventor
F. A. Selley

Witnesses
Louis R. Heinrichs
D. W. Gould.

By Victor J. Evans
Attorney

UNITED STATES PATENT OFFICE.

FREDERICK AUGUST SELLEY, OF NASHVILLE, TENNESSEE.

SCALE.

No. 854,609.  Specification of Letters Patent.  Patented May 21, 1907.

Application filed May 29, 1906. Serial No. 319,357.

*To all whom it may concern:*

Be it known that I, FREDERICK AUGUST SELLEY, a citizen of the United States, residing at Nashville, in the county of Davidson and State of Tennessee, have invented new and useful Improvements in Scales, of which the following is a specification.

The invention relates generally to an improvement in scales and particularly to an automatic computing scale designed for accurately determining the weight of any articles placed upon the scale pan.

The main object of the present invention is the production of a scale of the type described wherein the weight of the article supported on the scale pan is directly transmitted to and serves to revolve a shaft with the effect to move a pointer or indicator over a fixed scale strip.

Another object of the invention is the production of means whereby equilibrium of the movable parts of the scale is quickly gained after the deposit of the article on the scale pan, the construction providing against vibration of the parts.

Another object of the invention is the production of means whereby the maximum capacity of the scale as indicated on the scale strip may be increased by the addition of a determinate weight or weights for use as a counterpoise to the drum.

The invention will be described in the following specification, reference being had particularly to the accompanying drawings, in which:—

Figure 1:
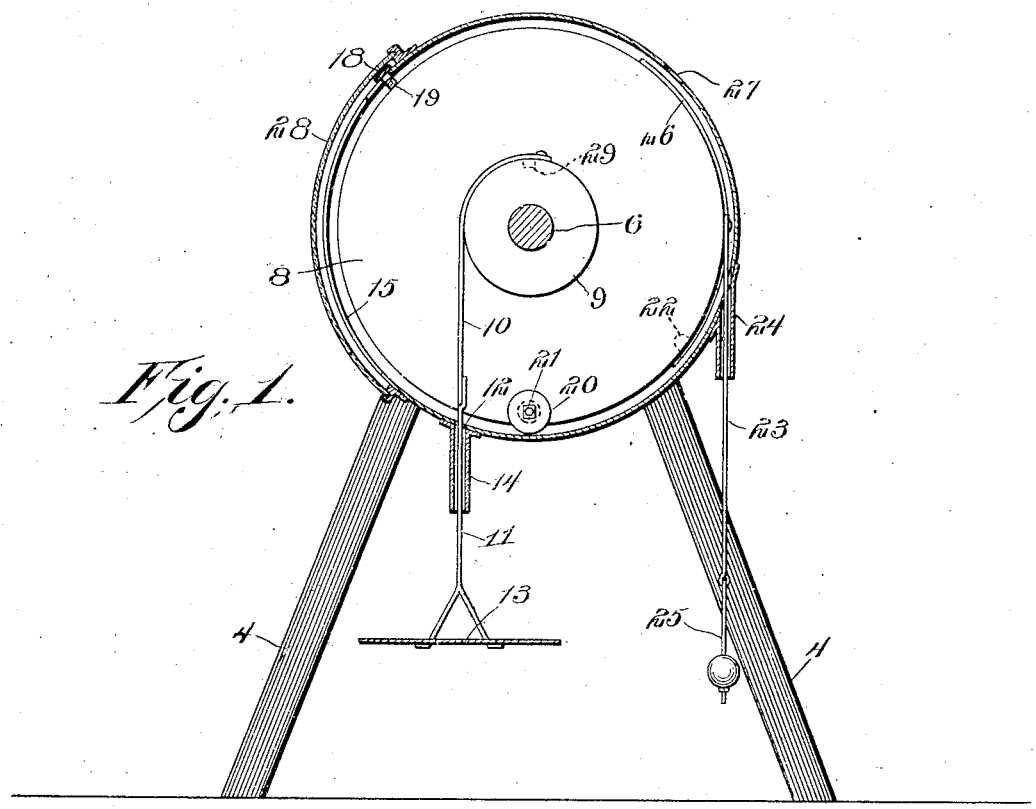
Figure 2:
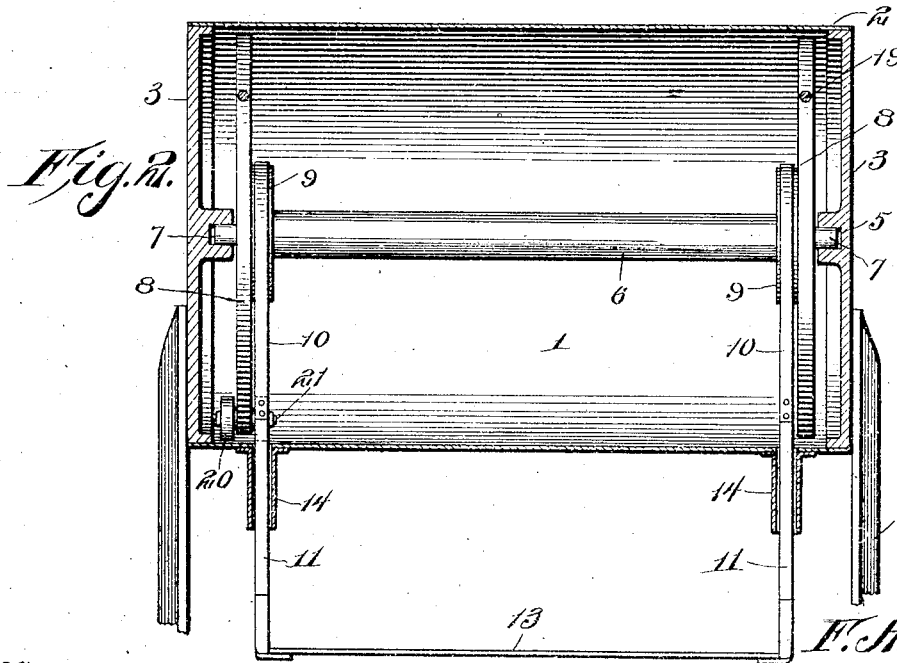

Figure 1 is a vertical central transverse section through a scale constructed in accordance with my invention, Fig. 2 is a longitudinal central section of the same, the drum being shown in elevation. Fig. 3 is a view of the scale strip developed. Fig. 4 is a plan of a modified form of pointer.

Referring to the drawings, wherein similar reference numerals indicate like parts throughout the several views, my improved scale comprises a casing 1 including a cylindrical section 2 and heads 3 for said section. The casing forms a fixed housing for the operating parts, being preferably supported upon legs 4 or in any other convenient manner. The inner surfaces of the heads 3 are centrally formed with bearings 5, of the particular type to be hereinafter noted. Revolubly supported within the bearings 5 is what I term the scale drum, comprising a shaft 6 formed at its ends with trunnions 7 for coöperation with the respective bearings and provided near each trunnion with a disk 8, preferably of a diameter somewhat less than the interior diameter of the casing. Each disk is formed on the inner surface with a centrally arranged concentric projection 9, hereinafter termed the strap disks, the latter being preferably provided with means to secure the disk on the shaft. As thus constructed the scale drum is of skeleton formation comprising a central shaft formed with end trunnions, and provided immediately adjacent said trunnions with disks, each of which disks is formed or provided on the surface facing the opposing disk with relatively similar disks, it being understood that said disks and shaft are secured together in relatively fixed relation.

Each strap disk is provided with a strap 10 terminally secured thereto at one end and connected at the opposite end with a bar 11 depending through an opening 12 formed in the casing, the lower end of the bars 11 being branched or otherwise formed to properly support a scale pan 13. The scale pan 13 is thus pendent below and forward of the casing, and provides against undue vibration of the parts under the influence of an article deposited upon the pan. I secure upon the casing 1 in alinement with the opening 12 a sleeve 14, arranged to receive the bar 11 in a manner to permit independent vertical movement of said bar and prevent undue lateral movement thereof. The scale pan is thus prevented from swinging or vibratory movement ordinarily incident to scales of this character and which tends to overbalance the drum and retard to a considerable extent the necessary state of equilibrium of the parts.

The cylindrical strip 2 is provided in its forward portion with circumferentially arranged slots 15, opposite the edges of the disks 8, and of a length to accord with the maximum movement of the scale. A scale strip 16 is secured to the face of the casing including the slots 15, said scale strip being also slotted at 17 to correspond and register with the slots 15. An indicator or pointer 18 is secured to the edges of the disks 8, said pointer overlying but avoiding direct contact with the scale strip, the connecting means between the pointer and disk, as screws 19, projecting through the respective slots 15 in the casing. The drum is provided with a counterpoise 20, preferably in the form of disk-like weights secured to the normally lower edge of one of the disks by a bolt 21, said weights 20 being preferably in duplicate and secured upon opposite sides of the disk. By this construction the main counterpoise is readily removable when desired. One or both of the disks are further provided with a counterpoise 22 to counterbalance the weight of the pointer and securing means. Pendent from the normally rear portion of one of the disks is a rod 23, also operative through an opening in the casing and a sleeve 24 as in the scale pan supporting means. The free lower end of the rod 23 is provided with any desired form of weight holder 25, to provide for the reception of additional weights in the event it is desired to increase the normal maximum capacity of the scale.

The scale strip 16 is provided on its outer surface with a series of characters to indicate the weight of the article supported on the pan in pounds and ounces and to simultaneously indicate the price of such article at varying amounts per pound. To provide for this result the strip is divided into a column 30 at one side of one of the slots 17 therein and said column divided by a series of transverse lines into ounces and pounds, and between the slot 17 the strip is divided into a series of vertical columns 31 bearing at their heads a price amount per pound, each column being further divided in accordance with the division of the weight column, and each of said divisions in the price column are to be inscribed with an amount determined by the number of pounds alined with said particular space at the price per pound noted at the head of the column. As the pointer is in effect an indicator strip reaching wholly across the computing section of the strip, it is obvious that the upper edge of said counter will register with the total price of the article being weighed at any given price per pound, while the end of the pointer overlying the pound divisions will indicate in pounds and ounces the weight of the article.

If desired the peripheral edge of the disks 8 at the portion normally in diametrically opposed relation to the scale strip 16 may be provided with a scale strip 26, indicating pounds and ounces with the particular indicating mark visible through the opening 27 formed in the rear portion of the casing, so that the amount indicated on the scale may be visible from both sides thereof. The scale strip 15 is preferably housed by an overlying plate 28 of transparent material, whereby to protect the operating part in an obvious manner.

The operation of the device will be fully apparent from the construction described, it being noted that the sleeves 14 are shaped to prevent vibration of the scale pan incident to the deposit of an article thereon, so that the scale will quickly reach a set position after the deposit of the article. In the normal position of the straps 10, they are partially wound about the strap disks 9, and therefore as said straps unwind in the weighing movement of the drum, they increase the weight in favor of the scale pan. As such increase interferes with the accuracy of the scale provision is made to counteract it by recessing the scale disks 9 immediately adjacent the connection of the straps 10 thereto, as shown at 29. The material thus cut from the strap disk will provide a slight excess weight favoring the diametrically opposed portion of the disk, thus counterbalancing the extra weight provided in the unwinding of the straps.

The pointer 18 is divided by a series of transverse lines to provide columns registering with the price columns on the scale strip, and in these columns on the pointer is marked a price mark corresponding to the price mark at the head of the registering column on the scale strip. The pointer thus provides and carries a price per pound table, so that the particular column may be readily found by means of the pointer without regard to the price mark at the head of the columns of the scale strip.

Having thus described the invention what is claimed as new, is:—

1. A scale comprising a casing, a rotatable member supported in the casing, an article support, connections between said support and member, and sleeves projecting beyond the casing to receive said connections, said sleeves being of interior sectional contour corresponding with the sectional contour of the connections.

2. A scale comprising a casing, a rotatable member supported in the casing, a scale pan, a flexible connection secured to the member, an inflexible section extending from the connection to the pan, and sleeves projecting from the casing and of an interior contour to correspond with the sectional contour of the inflexible section.

3. A scale comprising a casing, a sectional strip fixed upon the casing a rotatable member mounted therein, said member comprising a shaft supported in the casing, and disks secured upon the shaft, a scale pan and connections secured upon the periphery of the disks and to the pan, and means for guiding said connections to prevent vibration of the pan.

4. A scale comprising a relatively fixed casing, a movable member therein, an article support connected with the member, and an additional weight carrier depending from the member beyond the casing, and means pendent from the casing to receive and guide the additional weight carrier.

5. A scale comprising a casing formed with slots, a rotating member mounted therein and comprising a shaft, and spaced disks, a scale pan, connections between said pan and disks, a scale strip fixed to the casing and formed with slots to register with the slots in the casing, studs projecting from the disks and extending through said registering slots, and an indicator secured to the studs and overlying the scale.

In testimony whereof, I affix my signature in presence of two witnesses.

FREDERICK AUGUST SELLEY.

Witnesses:
J. H. HENDERSON,
J. M. STUART.